(12) United States Patent
Berghe

(10) Patent No.: US 9,904,344 B2
(45) Date of Patent: Feb. 27, 2018

(54) METHOD OF EXECUTING AN APPLICATION ON A COMPUTER SYSTEM, A RESOURCE MANAGER AND A HIGH PERFORMANCE COMPUTER SYSTEM

(71) Applicant: FUJITSU LIMITED, Kawasaki-shi, Kanagawa (JP)

(72) Inventor: Sven van den Berghe, Marlow Bucks (GB)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 14/676,952

(22) Filed: Apr. 2, 2015

(65) Prior Publication Data

US 2015/0378419 A1    Dec. 31, 2015

(30) Foreign Application Priority Data

Jun. 27, 2014 (EP) .................................... 14174845

(51) Int. Cl.
*G06F 1/32* (2006.01)
*G06F 9/50* (2006.01)

(52) U.S. Cl.
CPC ............ *G06F 1/3206* (2013.01); *G06F 1/324* (2013.01); *G06F 1/329* (2013.01); *G06F 1/3228* (2013.01);
(Continued)

(58) Field of Classification Search
CPC ...... G06F 1/3206; G06F 1/3228; G06F 1/324; G06F 1/3287; G06F 1/329; G06F 1/3296;
(Continued)

(56) References Cited

U.S. PATENT DOCUMENTS 8,635,475 B2 * 1/2014 Lin ....................... G06F 1/3215
713/300
8,706,798 B1   4/2014 Suchter et al.
(Continued)

OTHER PUBLICATIONS

European Search Report dated Nov. 12, 2014 in corresponding European application 14174845.9.
Iqbal, Saeed; "Job Scheduling in HPC Clusters", Dell Power Solutions, Feb. 2005. pp. 133-136.
"Cluster Implementation and Management; Scheduling", Parallel and High Performance Computing, Spring 2013, pp. 1-29.

*Primary Examiner* — Abdelmoniem Elamin
(74) *Attorney, Agent, or Firm* — Staas & Halsey LLP

(57) ABSTRACT

In an HPC system, a Resource Manager deliberately introduces heterogeneities to the execution speeds of some, but not all, of the nodes allocated to an application during the application's execution. These heterogeneities may cause changes to the amount of time spent waiting on coordination points: computation intensive applications will be most affected by these changes, IO bound applications less so. By monitoring wait time reports received from a Communications library, the Manager can discriminate between these two types of applications and suitable power states can be applied to the nodes allocated to the application. If the application is IO bound then nodes can be switched to a lower-power state to save energy. This can be applied at any point during application execution so that the hardware configuration can be adjusted to keep optimal efficiency as the application passes through phases with different energy use and performance characteristics.

10 Claims, 6 Drawing Sheets

(52) U.S. Cl.
CPC .......... *G06F 1/3287* (2013.01); *G06F 1/3296* (2013.01); *G06F 9/5094* (2013.01); *Y02B 60/1217* (2013.01); *Y02B 60/1282* (2013.01); *Y02B 60/1285* (2013.01); *Y02B 60/142* (2013.01); *Y02B 60/144* (2013.01); *Y02B 60/32* (2013.01)

(58) Field of Classification Search
CPC .............. G06F 9/5094; Y02B 60/1217; Y02B 60/1282; Y02B 60/1285; Y02B 60/142; Y02B 60/144; Y02B 60/32
See application file for complete search history.

(56) References Cited

U.S. PATENT DOCUMENTS

| | | | |
|---|---|---|---|
| 9,495,217 B2 * | 11/2016 | Chen | ................ G06F 9/5033 |
| 9,606,837 B2 * | 3/2017 | Chen | ................ G06F 9/5033 |
| 2005/0125701 A1 | 6/2005 | Hensbergen et al. | |
| 2009/0100437 A1 | 4/2009 | Coskun et al. | |
| 2012/0110360 A1 * | 5/2012 | Lin | ................ G06F 1/3215 |
| | | | 713/324 |
| 2012/0216205 A1 | 8/2012 | Bell, Jr. et al. | |
| 2013/0139170 A1 | 5/2013 | Prabhakar et al. | |
| 2014/0089699 A1 | 3/2014 | O'Connor et al. | |
| 2016/0334864 A1 * | 11/2016 | Cheatham, III | .......... G06F 3/01 |

* cited by examiner

METHOD OF EXECUTING AN APPLICATION ON A COMPUTER SYSTEM, A RESOURCE MANAGER AND A HIGH PERFORMANCE COMPUTER SYSTEM

CROSS-REFERENCE TO RELATED APPLICATIONS

This application claims the benefit of European Application No. 14174845.9, filed Jun. 27, 2014, in the European Intellectual Property Office, the disclosure of which is incorporated herein by reference.

BACKGROUND

1. Field

The present application relates to energy-aware resource management in a computer system, such as a high-performance computer system (HPC system).

2. Description of the Related Art

The invention addresses energy consumption in computer systems, for example the amount of energy consumed by programs running on large-scale computer clusters, particularly high performance computing (HPC) systems. HPC clusters consist of a large number of quasi-independent computers (nodes) that are coupled together and may be used to execute one large, monolithic application. Applications (or other jobs) are split into a number of communicating tasks; and these tasks are allocated to nodes by a Resource Manager.

The Resource Manager is responsible for the efficient running of the HPC system, making sure that resources, including nodes, (and any other resources) deliver a service to requirements. The over-riding service requirement is generally to complete the application as fast as possible but, since the nodes may be high-end computers and use a lot of energy, a secondary requirement, whose importance is rising, is to use as little energy as possible. The compute nodes have a variety of mechanisms that can be used to reduce the energy but these usually come at the cost of computational performance.

Increases in the capability of the microprocessors that form the core of the servers result in increased energy use. However, modern microprocessor designs also have the ability to reduce power consumption when the highest performance is not required. This is achieved through a variety of techniques, such as voltage and frequency scaling or turning off unused sections of a microprocessor. This capability is made available through the operating system to the Resource Managers so that they can reduce the power consumption of their cluster, but use of this capability must be balanced against the need to maintain performance of the applications executing on the cluster.

The overall performance of an application depends on a number of factors. Computational performance is important in many HPC applications, and these are said to be "compute-bound" or CPU-bound. Some applications are dominated by other factors, such as reading and writing data to memory or communicating data between nodes: these are said to be IO (input-output) bound. The performance of compute-bound applications is adversely affected by placing nodes into energy-saving states, but IO bound applications can have their nodes placed into energy saving states with minimal impact on performance. A Resource Manager has no a priori way of knowing if an application under its control is compute-bound or IO-bound and so cannot place any application into energy-saving mode whilst guaranteeing no reduction in performance. Applications may also pass through various phases during their execution and these phases can have different characteristics, one phase might be compute bound, but the following IO bound.

Many Resource Managers expose the ability to set the energy saving mode of a job to the user of the HPC cluster. This capability is not however always well used since the users may not be motivated to save energy (unless, for example, they are being charged for energy used in addition to other resources used). Also, users will not want to reduce the execution performance of their applications (i.e. they want to minimize the time to solution). Therefore, it is desirable for Resource Managers to automatically apply energy saving modes where it can be guaranteed that performance will not be affected.

The state of the art in such "energy-aware" Resource Managers is represented by US patent applications US 20120216205 and US 20090100437. These describe a Resource Manager with a database of the performance characteristics of previously submitted jobs and a computational model of the effect of placing a cluster into energy saving mode on a job with the given performance characteristics. If the Resource Manager can identify a job as the same as one previously submitted, it uses the recorded characteristics to compute the best energy configuration that does not impact performance.

The problem that these patent applications do not address is that there is no guarantee that a resubmitted job will have the same performance characteristics as the previous submission. Resource Managers cannot know from outside an application what the optimal settings are for energy efficiency. Even though the same application may have been submitted previously, there could have been changes not visible to the Resource Manager that affect the energy use characteristics. These changes include modifications to the code, selection of a different solution algorithm, a different mapping of load to compute nodes, a change to the problem size or a change to enabled options. All of these changes can affect the energy use characteristics of an application and the interaction between configurations and computational performance, so past experience with an application is not a reliable guide to the execution of the current application with the current initialization files.

Therefore, it is desirable to provide energy-aware execution which does not rely on previously submitted jobs.

SUMMARY

Additional aspects and/or advantages will be set forth in part in the description which follows and, in part, will be apparent from the description, or may be learned by practice of the invention.

According to one aspect of the invention there is provided a method of executing an application on a computer system by a plurality of nodes, the application comprising at least one iteration phase and the nodes having a plurality of power states, the method comprising:

a) starting execution of the application with the nodes in a default power state;

b) monitoring wait times of nodes to determine that execution has reached an iteration phase, and determining an average wait time of the nodes;

c) for a subset of the nodes, changing the power state;

d) continuing to monitor wait times and comparing with the wait times determined in the default power state to decide whether the iteration phase is input-output bound or not; and e) if the iteration phase is input-output bound, changing the power state of all the nodes to reduce energy consumption and continuing execution.

Such a method is most conveniently performed by a means of a Resource Manager as defined below. Such a Resource Manager can monitor progress of the application in each of the nodes by receiving notifications from a communications library, for example, which is accessed by the nodes during execution.

Step a) may involve starting execution in a homogeneous execution state. However, some systems are inherently heterogeneous.

Steps c) and d) are preferably repeated for each of a plurality of power states, each repetition using a possibly different subset of the nodes.

Here, the plurality of power states comprise at least a highest and lowest power state of the nodes; more generally the plurality of power states will comprise each of a plurality of possible power states of the nodes, as defined for example by setting various values of clock frequency, power supply voltage etc. for each node.

In any method as defined above, preferably, the size of the subset is determined by observing the effect, on average wait times of nodes, of changing the power state of different numbers of said nodes.

Preferably, the wait times are wait times at global barriers of the application. Such "global waits" can be detected, for example, by a communications library which is referred to during execution of the application.

In any method as defined above, preferably, step e) comprises changing the power state of the nodes to a power state which produces no detectable change in wait times.

In one form of the invention, step e) comprises continuing execution of the application to the end using the changed power state. Alternatively, steps b) to e) are repeated for at least one further iteration phase of execution of the application.

According to a second aspect of the present invention, there is provided a Resource Manager managing nodes of a computer system to execute an application comprising at least one iteration phase, the nodes having a plurality of power states, the Resource Manager comprising:

a scheduling module for allocating respective portions of the application to the nodes;

a power setting module arranged for setting power states of each of the plurality of nodes;

a wait time monitoring module for monitoring wait times of nodes and calculate an average wait time; and an application type determining module for deciding, based on the average wait time; whether the application is input-output, IO, bound or not; wherein the power setting module is arranged to start execution of the application with the nodes in a default power state;

the wait time monitoring module is arranged to monitor wait times of nodes to determine that execution has reached an iteration phase, and to calculate an average wait time of the nodes;

the power setting module is responsive to a determination that execution has reached an iteration phase, to change the power state of a subset of the nodes;

the wait time monitoring module is arranged to continue to monitor wait times and calculate an average wait time in the changed power state;

the application type determining module is arranged to decide whether the application is IO bound or not by comparing the average wait time in the changed power state with the average wait time determined in the default power state; and the power setting module is responsive to a decision that the application is IO bound, to change the power state of all the nodes to reduce energy consumption.

Preferably the application is executed with the assistance of a communications library and the wait time monitoring module monitors the wait times of nodes by receiving notifications from the communications library.

A further aspect of the present invention provides a high-performance computer system comprising nodes or servers coupled together by an interconnect to form a cluster and a Resource Manager as described above.

A still further aspect relates to software for providing the above mentioned Resource Manager. Such software may be stored on one or more non-transitive computer-readable recording media.

Large-scale computer systems, such as modern high performance computer (HPC) systems, use large amounts of energy. There is a strong desire to reduce this for cost and social responsibility reasons. The component nodes of HPC clusters have the ability to reduce their energy consumption, but at the cost of reduced performance for some, but not all, types of application. An HPC cluster Resource Manager can save energy while maintaining performance if it can identify those applications that will not lose performance when executed in energy-saving mode.

This invention allows the discovery of the most efficient configuration of the hardware for a particular application, one that achieves unchanged performance with the lowest power consumption, whilst the application is executing.

Embodiments aim to allow the execution of computer jobs on HPC clusters in an energy saving mode without affecting performance. To do this requires identification of the characteristics of a job submitted to the cluster. The characteristics of HPC jobs are very variable from submission to submission and often vary during the execution of one job. Using prior knowledge of submitted jobs is thus unreliable; the characteristics of every job must be determined individually on submission and ideally during execution.

A principle adopted in embodiments is to acquire this information by applying tests to an executing application. The tests should be non-invasive, not changing the execution results and with small impact on the run-time of the application. They should be sensitive, execute quickly and reliably. Tests with these characteristics can be applied repeatedly during execution so that the energy use can be fine tuned as the performance characteristics evolve during execution.

To this end, embodiments of the present invention deliberately introduce heterogeneities to the execution speeds of some, but not all, of the nodes allocated to an application during the application's execution. As HPC applications require coordination between the nodes, for example to pass data or to globally synchronize computations, these heterogeneities may cause changes to the amount of time spent waiting on these coordination points. Computation intensive applications will be most affected by these changes, IO bound applications less so. This means that the invention can discriminate between these two types of application and so allow the best energy configurations to be set.

Having determined whether the application is CPU-bound or IO bound, suitable power states can be applied to the nodes allocated to the application. This can be applied at any point during application execution, so that the hardware configuration can be adjusted to keep optimal efficiency as the application passes through phases with different energy use and performance characteristics.

In this specification, the terms "node", "server", "processor", "microprocessor" and "CPU" are used interchangeably unless the context demands otherwise, as are "program", "application" and "job". The terms "run" and "execution" are equivalent. Likewise, the terms "(HPC) system", "cluster" and "server collection" are equivalent.

BRIEF DESCRIPTION OF THE DRAWINGS

Reference is made, by way of example only, to the accompanying drawings in which.

DETAILED DESCRIPTION

Figure 1:
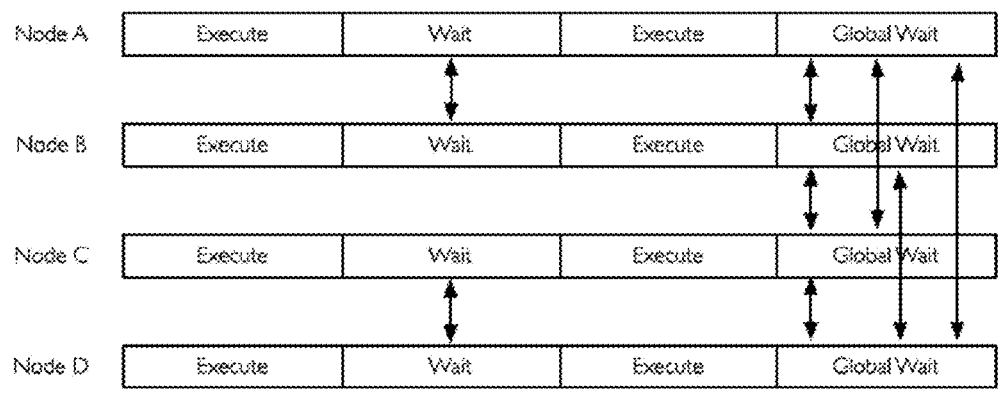
FIG. 1 shows an execution timeline of an application apportioned among a plurality of nodes.

Reference will now be made in detail to the embodiments, examples of which are illustrated in the accompanying drawings, wherein like reference numerals refer to the like elements throughout. The embodiments are described below to explain the present invention by referring to the figures.

As indicated above, embodiments address the problem of reducing the amount of energy consumed by programs running on large-scale computer systems, particularly high performance computing (HPC) systems, in which tasks are allocated to nodes by a Resource Manager.

The role of the Resource Manager is to allocate the tasks amongst the nodes so that an appropriate quality of service measure is reached e.g. a group of tasks is completed in the shortest time, or a particular task finishes by a certain time. Resource managers use sophisticated algorithms and heuristics that rely on knowledge of the availability of resources in the HPC system. Resources can include processor time, server memory, network bandwidth or the availability of a software license. Resource Managers also ensure that the cluster is used as efficiently as possible, and one of the measures of efficiency, particularly for large HPC clusters, is the amount of energy that they use.

If Resource Managers can reliably detect the characteristics of the application execution, then more energy saving can be achieved by actively managing power consumption states. This principle will now be explained in more detail with respect to FIGS. 1 to 6 of the drawings.

The high-level architecture of HPC systems is a collection of quasi-independent nodes coupled by a communications network. Applications running on HPC systems are distributed over the nodes and each portion of the application is decoupled as much as possible from the other portions, although some communication between the nodes is always necessary. Communication leads to the nodes having to coordinate their execution as they wait for the arrival of messages from other nodes. The degree of coordination varies with application and algorithm type, but there are usually many times during an application's execution where nodes will wait on the completion of computations on other nodes. A number of these waits for coordination require global communications (i.e. across all nodes allocated to the application) and so any delays to the execution by one node will cause the whole application to wait for the slowest node to catch up.

FIG. 1 shows execution phases of a simple program executing on four nodes, with time represented by the length along the horizontal bars. The program has four phases: execute, wait, execute and wait. The wait dependencies are shown as arrows between the nodes. The first wait phase models a local coordination barrier since the nodes only communicate in pairs that is, A with B and C with D. The second wait models a global coordination barrier; every node waits on all the other nodes before completion. This is labeled "Global Wait" in the Figure to indicate that all nodes (in general) must wait here.

Figure 2:
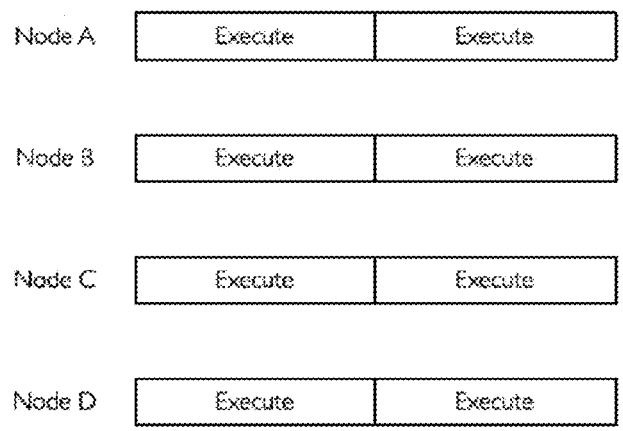
FIG. 2 shows an execution timeline of an application with homogenous nodes.

FIG. 2 shows the execution timeline for the program of FIG. 1 when the nodes are homogeneous with identical execution times (for example, due to having identical computational ability and comparable portions of the application assigned to them). Since all nodes arrive at the wait phase at the same time, no time is spent waiting and execution of the next phase can commence immediately.

Figure 3:
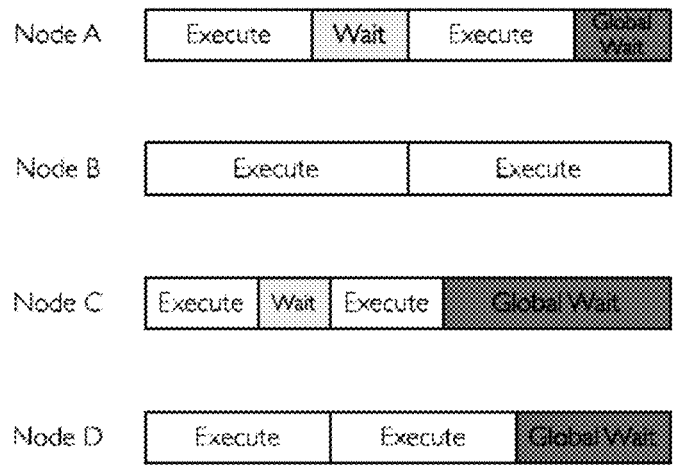
FIG. 3 shows an execution timeline of an application with heterogeneous nodes.

FIG. 3 shows the execution timeline for heterogeneous nodes, for which the execution time is different for different nodes. Since some nodes now execute faster than other nodes there are periods of waiting (shaded in the Figure), except for the slowest node (B) which becomes the critical path. Node A waits after the first execution phase for its only partner Node B. Similarly Node C waits on Node D. The global wait after the second execute phase causes all the nodes to wait for B to complete.

Figure 4:
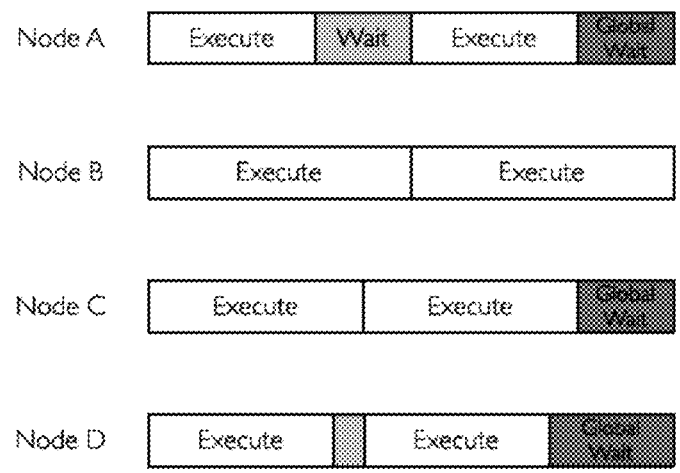
FIG. 4 shows the effect of applying a perturbation to one of the nodes in FIG. 3.

FIG. 4 shows the timeline for the same program with a change to the execution speed on Node C, such as would be introduced by reducing the clock frequency of a CPU bound program. This slowing down of Node C (referred to below as a "perturbation" of Node C, thus creating a "heterogeneity" between Node C and the other nodes) reduces the power consumption by Node C. On the other hand, the execution phases take longer, changing the distribution of wait phases in Node C and D (there is no change to Nodes A and B, as Node B is still the slowest node). The time spent in the global wait phase also changes. However, there is no change to the overall execution time even with the slowing down of one node.

Figure 5:
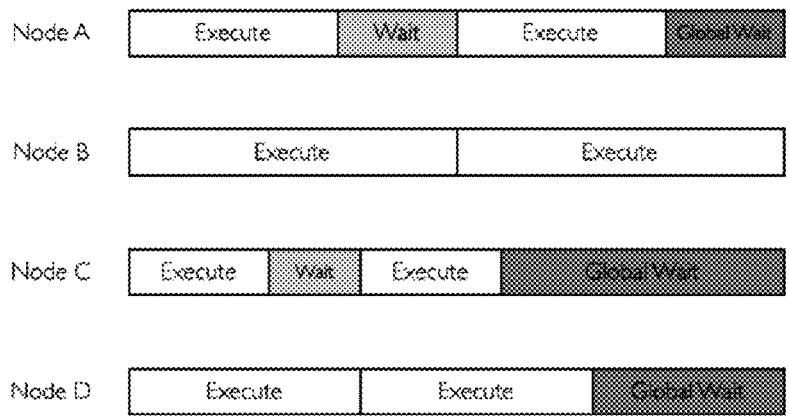
FIG. 5 shows the effect on the execution timeline of slowing all nodes equally.

Contrast the change to FIG. 4 with FIG. 5, which illustrates the effect of slowing all nodes by the same amount. The total time has changed, but the distribution of times spent in each phase on each node is, in proportion, the same. Clearly, the situation in FIG. 4 is preferable: less energy consumption with no impact on execution time.

Waiting nodes are idle resources and reduce overall computational performance, and so are usually reduced as much as possible. However, they still occur for a number of reasons. Some of these reasons persist throughout an application's execution; these inherent reasons include an imbalance in the load placed on the nodes and differing performance of heterogeneous or impaired nodes. There are also transient reasons ("jitter"), such as interference from other processes, which will have a short-term effect on performance. This means that nodes will always experience some amount of time waiting at barriers for other nodes.

By perturbing individual nodes as in the example of FIG. 4, heterogeneities can be created among the nodes. Where the HPC system consists of nodes in the form of independent computers, it is straightforward to change the settings of nodes individually—for example the computer's clock speed could be reduced. Introducing heterogeneities to the node execution time can have a significant impact on the execution time of an application as is shown in FIG. 6.

Figure 6:
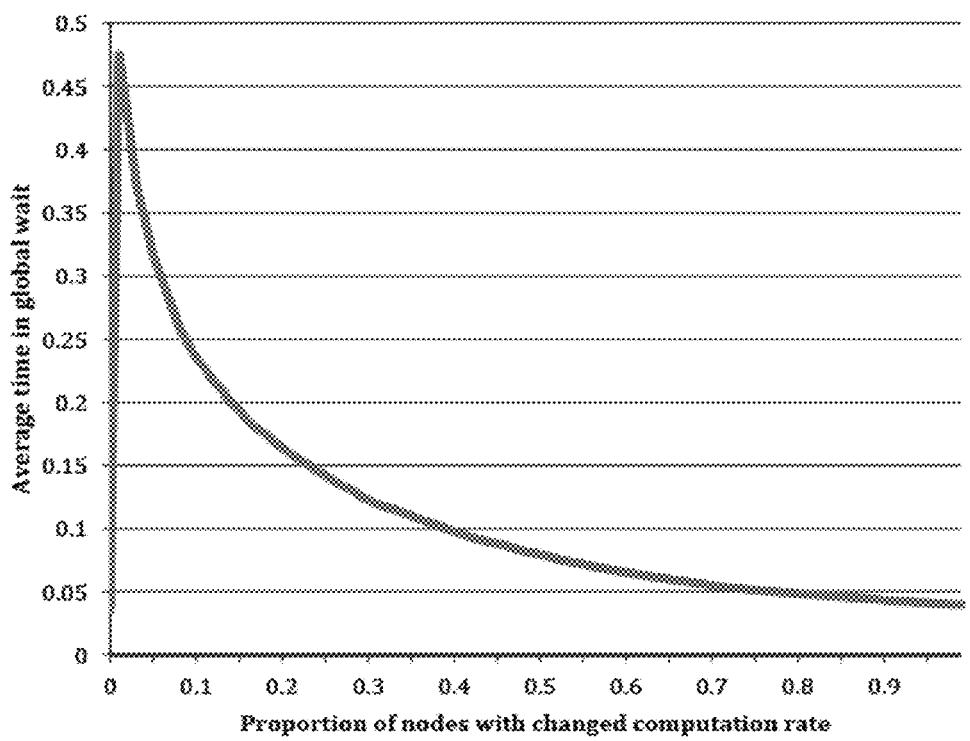
FIG. 6 is a graph showing a simulation of the effect of introducing heterogeneities to an application.

In FIG. 6, the x-axis represents the proportion of nodes whose computation rate (execution speed) is changed. A proportion of 0.1 corresponds to 10% of the nodes, 0.2 to 20% and so on. Thus, the extreme left-hand end of the graph represents the case of complete homogeneity with all nodes having the same execution speed. The extreme right-hand end of the graph likewise represents homogeneity (100% of the nodes being changed in the same way). At these points, there is a small but finite average global wait time of the nodes as shown on the y-axis.

In this simulation, a proportion of the nodes is perturbed to run 10% slower than the other nodes with a random background jitter (that is, an uncertainty in the amount of perturbation applied) of 5%. As can be seen from the Figure, when all nodes execute at the same rate—at either end of the x-axis of FIG. 6—the average wait time at a global barrier is small but similar. If there is a small amount of heterogeneity (a few nodes run slower than the majority), then the average global wait time increases significantly. It will be observed that the largest effect is seen with only a few % of nodes being perturbed. This is a general result which does not depend on a specific HPC system.

It should be noted that the nature of the perturbation applied to the nodes is not important, so long as it reduces the execution speed of the nodes concerned. Possible mechanisms include reduction of the clock frequency of the node, reduction of the operating voltage of the node; partial shutdown of computational functions of the node; and sharing resources of the node with another application (since normally, the application can be assumed to have exclusive access to the node). Preferably, the perturbation should not affect the I/O performance of the node.

In view of the effect observed above, embodiments of the present invention are based on the following considerations:

(i) Applications are distributed over a large number of nodes which can be controlled (at least with respect to power settings) individually.

(ii) The nodes execute their respective portions of the application independently but all non-trivial applications require communication between nodes and so have points where progress is dependent on partner nodes reaching a mutual coordination point (a barrier).

(iii) Applications typically consist of a number of initialization and iteration phases, each initialization phase being followed by an iteration phase. The initialization phases may be relatively short: perhaps less than 5% of the total execution time.

(iv) The rate of progress through a computation can vary from node to node, due for example, to imbalances in the load on a node, interference from other code executing on the node and differing node capabilities. This results in some nodes waiting for other nodes waiting at barriers.

(v) The average time spent in waiting at a global barrier is significantly affected by heterogeneity in execution rate of a small number of nodes.

(vi) Energy saving features on the node hardware affect the rate of progress through a computation if the application is CPU bound. This effect is significantly less for IO bound code.

These factors mean that it is possible to discriminate between CPU bound and IO bound applications by changing the energy saving feature settings on a small number of nodes, and monitoring average wait times at global barriers. If they change significantly from an unperturbed (homogeneous) system, then the application is CPU bound, if they do not change, then the application is IO bound.

Once this discrimination is made, IO bound applications can have the executing nodes placed into reduced power consumption modes, resulting in energy savings with no reduction in performance. For the remainder of execution of the current job, therefore (perhaps 80% of the total run time), the application can be executed with the optimal settings applied to all the nodes. This allows significant energy savings without having to refer to a history of previously-submitted jobs as in the prior art.

Bringing these observations together, the proposed process can be outlined as follows:

(a) Upon initial execution of a job, the Resource Manager schedules and allocates resources to the job as normal.

(b) The job is run using the default energy configuration until it reaches a stable execution point, i.e. it has finished initialization and is into an iteration part. The application is monitored and the average wait time at a global barrier is determined (the average is taken over the nodes allocated to the application and, possibly over several instances of reaching the barrier).

(c) The Resource Manager modifies the energy configuration of some of the nodes allocated to the application to new values, for example one that trades performance for energy saving. Modifying the energy configuration can be achieved by any one or more of reducing the node's clock speed, operating voltage, activated computational functions, or exclusivity to the application, as mentioned above. Below, this energy configuration is also referred to as a "power state".

(d) The Resource Manager observes the effect of these changes on the execution characteristics of the job; particularly monitoring changes to wait times at the global barriers used in Step (b).

(e) After a short period of monitoring, the Resource Manager analyses the data and determines from these the type of application (CPU or IO bound). This short period could be quantified, for example, as a few percent of the expected overall execution time. The expected overall execution time is usually provided by the user (so that the Resource Manager knows how long resources have to be allocated to the job). Alternatively, it would be possible to wait for a suitable proportion (such as one-quarter or one-half) of the time spent in the initialization phase.

(f) Knowing the application's characteristics, the Resource Manager then sets the best configuration for the job, and uses it for the remainder of the job execution. That is, the application is found to be IO-bound then the Resource Manager applies a reduced energy configuration to all the nodes executing the application. By contrast, if the application is determined to be CPU-bound then the Resource Manager restores all nodes to a default configuration (normally the highest-power setting for each node).

Thus, the present invention does not aim to detect the optimum power state for each node individually, but rather aims to find a global setting which reduces energy use with little or no impact on execution time.

Figure 7:
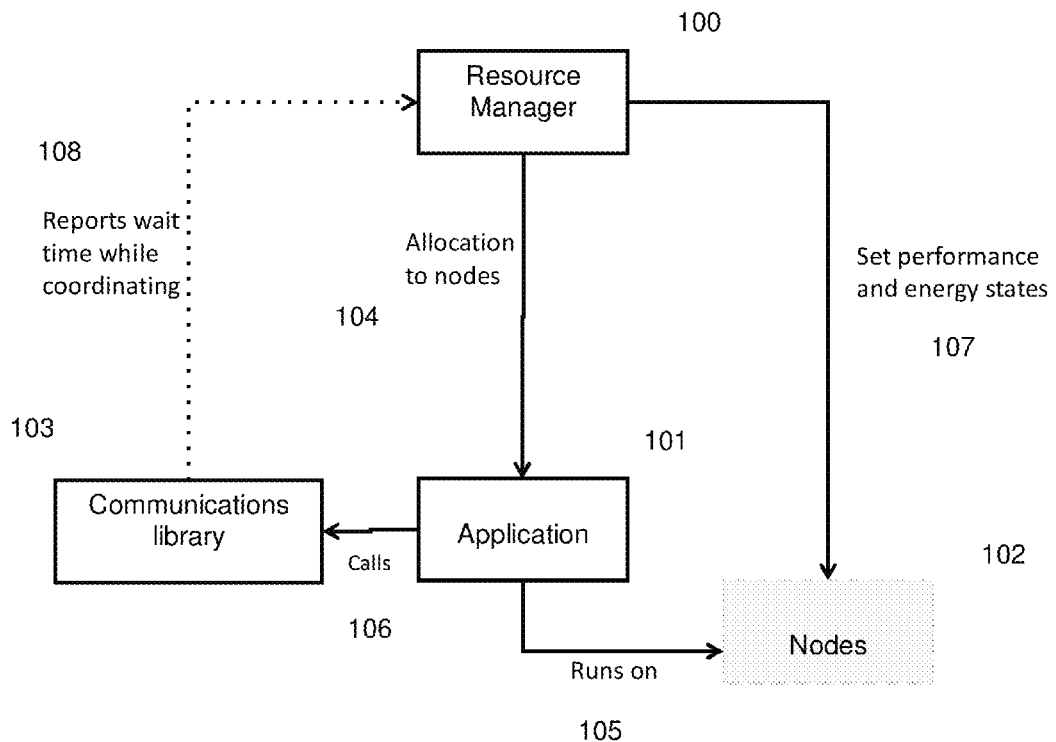
FIG. 7 is a schematic block diagram of a high-performance computing system embodying the present invention.

FIG. 7 is a schematic of a HPC system for implementing the invention, consisting of components 100, 102, 103 as explained below for executing an application 101. The Resource Manager 100 controls the HPC system, allocating applications to nodes and applying settings (such as clock speed, operating voltage etc. as discussed above) to the hardware. Applying power settings may be done with co-operation of a local operating system (not shown) of each of the nodes.

For the purposes of this discussion, it is assumed that a single application 101 is allocated to run on a number of nodes 102. The application needs to communicate data between the nodes, and to do this it uses a communication library 103. Communications libraries implement a standardized interface, such as MPI, and are supplied as a standard component of the support software for all HPC systems. They interface between the application code and the communications hardware to provide optimal performance.

Some of the interactions between these components are highlighted in the lines drawn between them. The Resource Manager allocates nodes to the execution of the application (104, 105). The executing application calls routines in the Communications Library to communicate data and to coordinate waits at barriers (106). The Resource Manager also applies settings to the nodes to control energy use and performance (107). To monitor the wait times as outlined earlier, the Resource Manager needs to know whether nodes are in an execute phase or a wait phase. For this purpose, a new interaction (108) is introduced to communicate information from the Application to the Resource Manager via the Communications Library. This interaction is described below.

Figure 8:
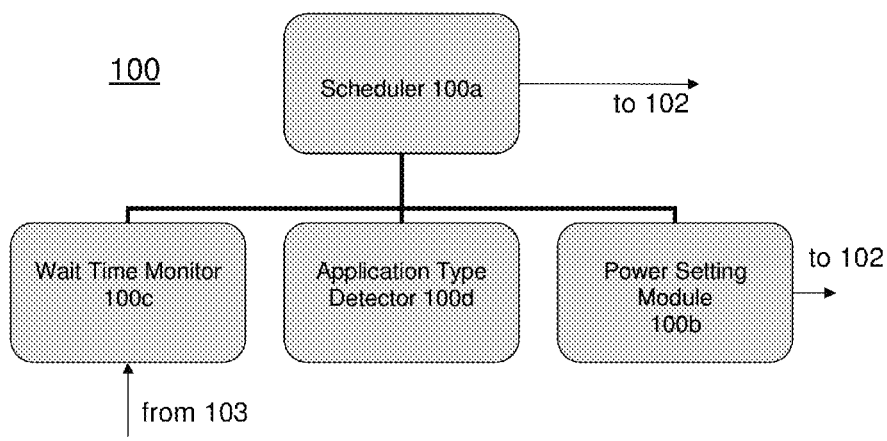
FIG. 8 is a schematic block diagram of functional modules of a Resource Manager.

Functional modules of the Resource Manager 100 are shown schematically in FIG. 8. In addition to a scheduler 100a for allocating portions of the application execution (job) to each node, there is a power setting module 100b capable of issuing commands to individual nodes to change their energy configurations. As indicated in the Figure, the modules 100a and 100b are connected to the nodes 102 to supply commands thereto. A wait time monitor 100c is connected to the communications library 103 to receive wait time reports as indicated at 108 in FIG. 7, and calculating average wait times. Since barrier waits are produced by calls to specific functions in the library, this is a convenient way to detect when nodes are waiting. An application type determining module 100d decides, based on comparing average wait times of nodes with or without perturbations as discussed above, whether the application (at least in the present phase) is IO-bound or not.

Figure 9:
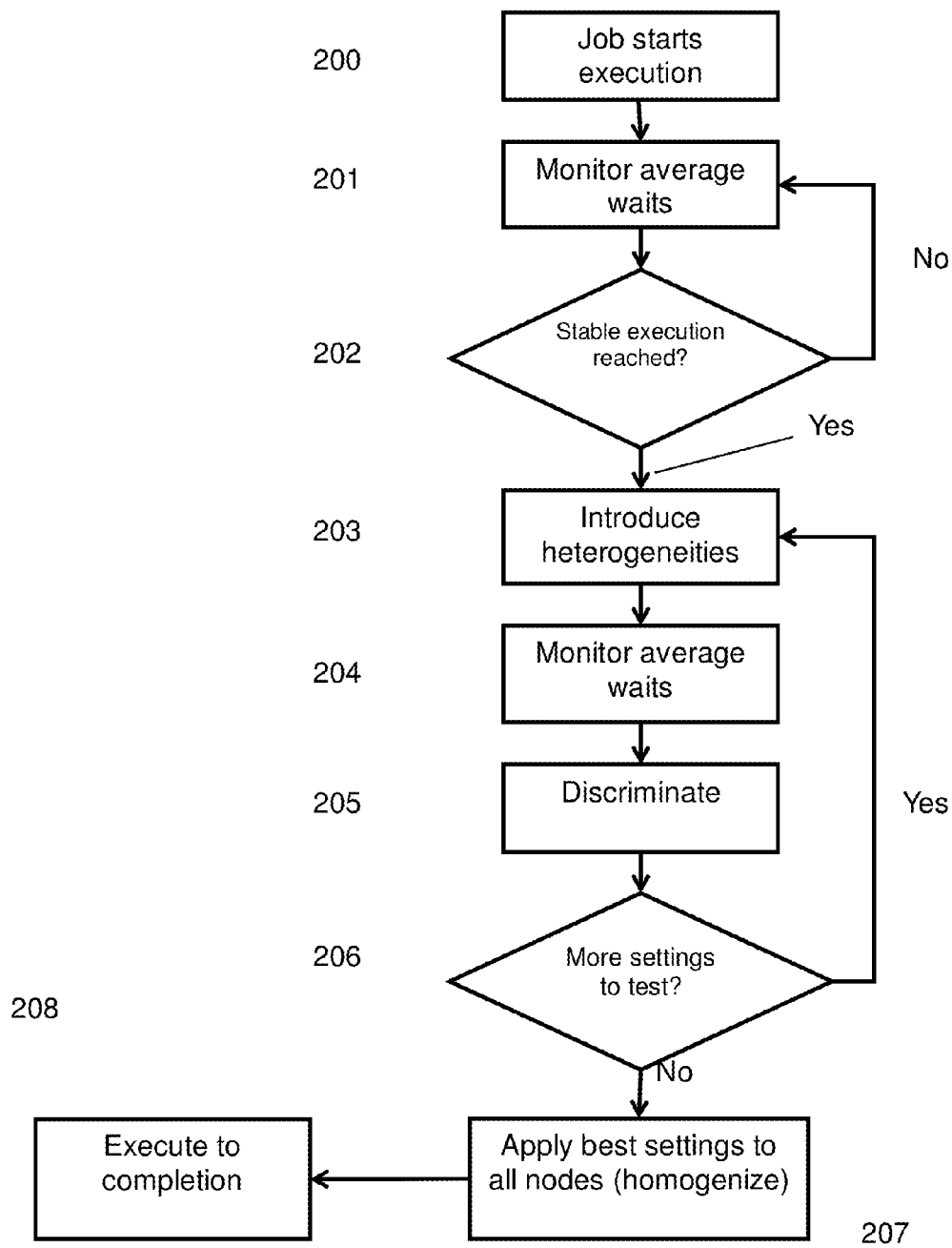
FIG. 9 is a flowchart of steps performed in a method embodying the present invention.

FIG. 9 shows the flow of execution from a job being allocated to a set of nodes, through determination of the characteristics and setting of the best configuration for the remainder of the execution.

At 200 a job is allocated to a set of nodes on the computer, and these nodes are set to default configuration. Here, "default configuration" means a configuration which would be adopted in the absence of energy-saving measures such as those of the present invention. In the case of identical nodes executing similar portions of the application, this would correspond to the homogeneous execution case of FIG. 2. However, as will be appreciated, the HPC system may comprise heterogeneous nodes, and/or the application portions assigned to respective nodes may differ in the amount of computational effort involved.

The Resource Manager receives reports from the job (via the communications library, 103) about the wait times of each node at the global barriers (201).

At some point (202, "Yes") these wait times will stabilize, i.e. there is a repeating pattern of waits with similar durations. This indicates that the job has reached the main section (in other words, an iteration phase) of execution.

The Resource Manager then introduces heterogeneities (203) to the execution rate of a subset of the nodes allocated to the job. Here, the "subset" means a smaller number of nodes than the set to which the job was allocated. The number of nodes in the subset is determined along the lines depicted in FIG. 6: that is, a proportion of nodes provoking the strongest response. As indicated by FIG. 6 this might be 1 or 2% of the nodes, for example. The heterogeneities are introduced randomly (in other words, the subset is a random subset of the full set of nodes).

The Resource Manager continues monitoring the wait times (204) and compares the new average time to the average times determined for homogeneous execution (from 201). This comparison allows discrimination between CPU bound and IO bound execution (205). As described below, there may be a number of possible power consumption states to test; each one can be tested in turn (206). Once all possible configurations have been examined, the optimal setting (power state) is applied to all the nodes (207) and the job executed to completion. That is, the settings determined by introducing homogeneities to individual nodes are applied equally to the whole set of nodes executing the application.

There are usually a number of different power consumption states for the nodes, each reducing the power consumption but having lower performance. It can generally be assumed that if there are N power states called $S_1$, $S_2$, $S_3$, . . . , $S_N$, then their power consumption P is ordered:

$P_1 > P_2 > P_3 > \ldots > P_N$ and the rate of execution R is ordered:

$R_1 > R_2 > R_3 > \ldots > R_N$.

All the nodes are initially (at 200) set to $S_1$, the highest-power (and thus highest-performance) setting. The first introduction of heterogeneity, at 203, sets the power states of some of the nodes (the "subset" referred to above) to $S_N$. Setting these nodes immediately to $S_N$ (rather than to some intermediate power level) is the quickest way to reveal an IO bound application.

If an IO bound application is detected at 205 (no change to wait times), then 206 passes through the no branch to 207 where $S_N$ is applied to all the nodes and execution completed (208). If, however, a CPU bound application is suspected (change to wait times), the nodes in state $S_N$ are set to $S_{N-1}$ (for example) at 203 and the monitor, discriminate loop—steps 203 to 206—executed again, using a different subset of randomly-selected nodes. Incidentally, in this step it would be possible to set the power state using a binary search, so that the next step tested is half way between the lowest value that shows no difference from $S_1$, and the highest tested so far.

The monitor, discriminate loop continues until no change to wait time is detected. If all states $S_1$, $S_2$, $S_3$, . . . , $S_N$ have been tested without any IO bound having been detected, then the homogeneous state is all nodes at $S_1$ (corresponding to no energy-saving and no change to the default configuration), otherwise it is the value of S which produced no detectable change to the global wait times.

In the above process, it is possible to use only a subset of the states; for example, rather than examine all the values of S, just $S_1$ and $S_N$ can be used. This approach may lead to some jobs being executed at higher power consumption, but with quicker selection of the final homogeneous state.

FIG. 6 shows that only a very small proportion of nodes should have a perturbed execution rate: between 1% and 5%, so the size of the subset considered above should be small. The proportion of nodes to be perturbed will be independent of any specific HPC system, so a general value can be chosen. Preferably, the size of the subset should be the same at each test (repetition of the monitor, discriminate loop) so as to discriminate an IO bound application from a response that is too small. However, where an IO bound application is suspected, it may help to increase the size of the subset to confirm that the subset size is large enough.

Although it was described above to apply the method of the invention early on in execution of the application and to apply the determined setting for the remainder of the execution, it is possible to apply the method again at any point during application execution, so that the hardware configuration can be adjusted to keep optimal efficiency as the application passes through phases with different energy use and performance characteristics.

That is, an HPC application often passes through several different phases in its computation, where each phase may have different memory and CPU use characteristics and as the application passes through these phases the optimal power use configuration may change.

Figure 10:
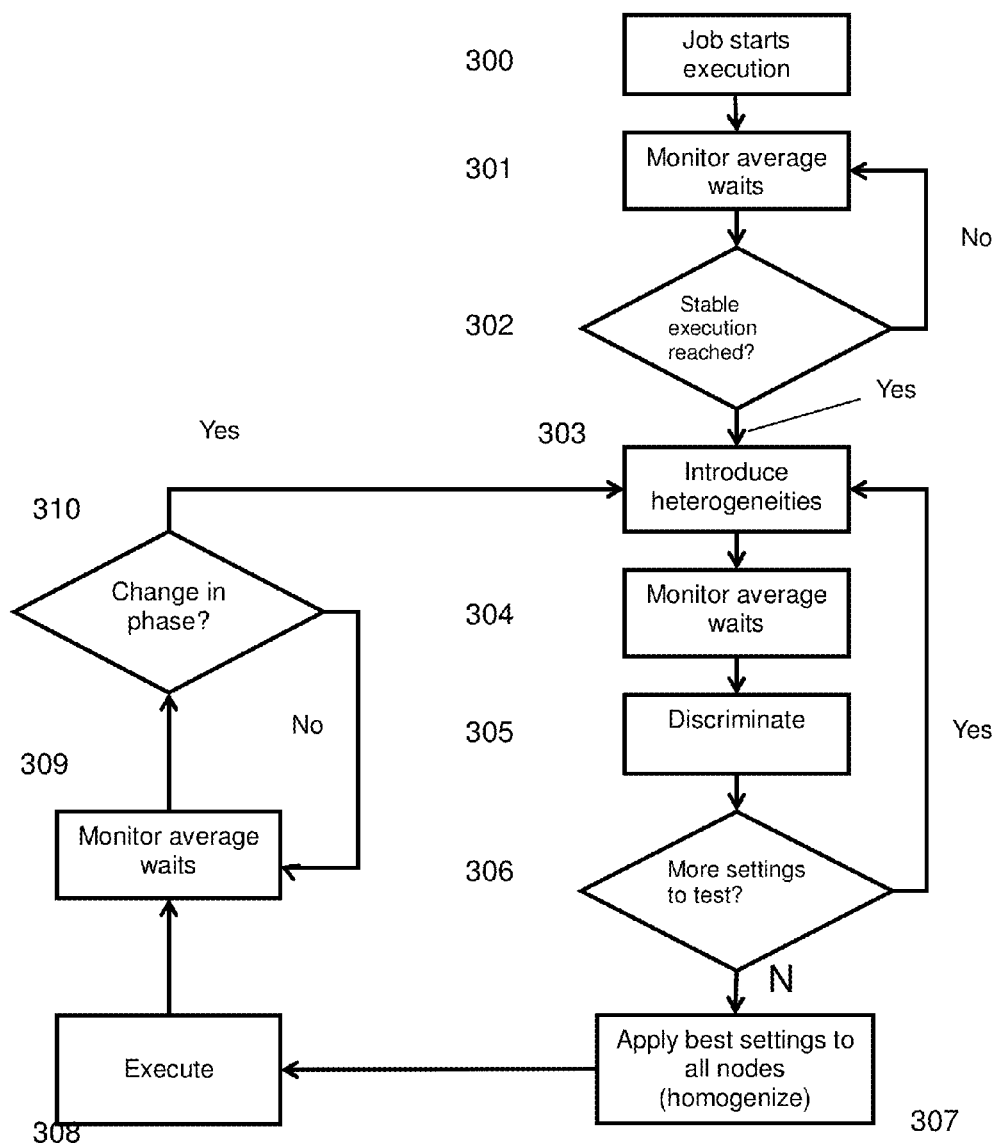
FIG. 10 is a flowchart of steps performed in a modified method embodying the present invention.

FIG. 10 shows, as a modified method embodying the present invention, how the flow of FIG. 9 can be extended to monitor execution and adjust power consumption configurations to adapt to changes in program phase. Steps 300 to 306 correspond to FIG. 9's steps 200 to 206, respectively. Once an optimal configuration has been found and the job's nodes homogenized to this (step 307), execution proceeds in step 308, but the Resource Manager monitors the wait times (309) for a change of phase (310). If one is detected, then the testing loop is re-entered at 303 and a new configuration determined.

Various modifications are possible within the scope of the invention.

In the above description, it was assumed that the Resource Manager modifies the energy configuration of some of the nodes in order to reduce their performance. However, this is not the only possible arrangement. It would be possible (if allowed by the node hardware) to temporarily boost the performance of individual nodes so as to expend more energy in the nodes in a critical path (those nodes with a large computational load and for which the other nodes have to wait). This would reduce the total energy expended by reducing the overall time spent to execute the application. In the method of FIGS. 9 and 10, this would necessitate starting the nodes in a power state below the highest possible state S1.

Although the Resource Manager 100 is shown in FIG. 7 as a single functional unit distinct from the nodes 102, it would be possible for the Resource Manager to be distributed among a plurality of functional units, and/or implemented on one or more of the nodes.

In the discussion above, N power consumption states were assumed; however, the present invention can be applied with as few as two possible power states of each node.

The method steps referred to herein may be carried out in a different order from the order of definition and still produce favorable results.

The Resource Manager may be implemented in software, hardware, middleware, as an application specific integrated circuit (ASIC) or in any other form.

INDUSTRIAL APPLICABILITY

This invention allows the discovery of the most efficient configuration of the hardware for a particular application, one that achieves unchanged performance with the lowest power consumption, whilst the application is executing, thereby reducing energy consumption in high-performance computing without necessarily prolonging execution time.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of executing an application on a computer system by a plurality of nodes, the application comprising at least one iteration phase and the nodes having a plurality of power states, the method comprising:
   starting execution of the application with the nodes in a default power state;
   monitoring wait times of nodes to determine that execution has reached an iteration phase, and determining an average wait time of the nodes;
   for a subset of the nodes, changing a power state;
   after changing the power state for the subset of nodes, continuing to monitor wait times and comparing monitored wait times with wait times determined in the default power state to determine whether the iteration phase is input-output bound; and
   if the iteration phase is input-output bound, changing the power state of all the nodes to reduce energy consumption and continuing execution.

2. The method according to claim 1, wherein the changing the subset and continuing are repeated for each of a plurality of power states, each repetition using a different subset of the nodes.

3. The method according to claim 2, wherein the plurality of power states comprise at least a highest and lowest power state of the nodes.

4. The method according to claim 2, wherein the plurality of power states are each of a plurality of possible power states of the nodes.

5. The method according to claim 1, wherein a size of the subset is determined by observing an effect, on average wait times of nodes, of changing the power state of different numbers of said nodes.

6. The method according to claim 1, wherein the wait times are wait times at global barriers of the application.

7. The method according to claim 1, wherein the changing all nodes comprises changing a power state of the plurality of power states of the nodes to a power state which produces no detectable change in wait times.

8. The method according to claim 1, wherein the changing all nodes comprises continuing execution of the application to the end using a changed power state.

9. The method according to claim 1 further comprising repeating the monitoring, changing the subset, continuing and changing all nodes for at least one further iteration phase of execution of the application.

10. A non-transitory machine-readable medium having program code stored thereon to be executed by a processor of a computer, whereby the computer performs the method according to claim 1.

* * * * *